(12) United States Patent
Crook et al.

(10) Patent No.: US 6,608,992 B2
(45) Date of Patent: Aug. 19, 2003

(54) WEB-BASED EDUCATION

(75) Inventors: Jay R. Crook, Corpus Christi, TX (US); Lois A. Sullivan, Kettering, OH (US); Donald W. McClain, Centerville, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/900,539

(22) Filed: Jul. 6, 2001

(65) Prior Publication Data

US 2003/0008271 A1 Jan. 9, 2003

(51) Int. Cl.7 .............................. G09B 3/00; G09B 7/00
(52) U.S. Cl. ....................................... 434/350; 434/362
(58) Field of Search ................................. 434/118, 236, 434/307 R, 322, 323, 350, 362; 709/204, 205; 707/10, 100, 104.1

(56) References Cited

U.S. PATENT DOCUMENTS

| 5,810,605 | A | * | 9/1998 | Siefert | 434/362 |
| 6,149,441 | A | * | 11/2000 | Pellegrino et al. | 434/350 |
| 6,155,840 | A | * | 12/2000 | Sallette | 434/323 |
| 6,334,779 | B1 | * | 1/2002 | Siefert | 434/350 |
| 6,336,813 | B1 | * | 1/2002 | Siefert | 434/350 |
| 6,347,943 | B1 | * | 2/2002 | Fields et al. | 434/118 |
| 6,386,883 | B2 | * | 5/2002 | Siefert | 434/350 |
| 6,421,706 | B1 | * | 7/2002 | McNeill et al. | 709/204 |
| 2001/0034016 | A1 | * | 10/2001 | Ziv-el et al. | 434/350 |
| 2002/0002554 | A1 | * | 1/2002 | Herdman | 707/10 |

* cited by examiner

Primary Examiner—Willis R. Wolfe
(74) Attorney, Agent, or Firm—Gregory A. Welte

(57) ABSTRACT

An instructional system. Private lessons are given to students, through a web site. The private lessons explain general principles of a topic. Then, the students participate in a remote conference, wherein a facilitator further explains the general principles, and provides examples of their application.

20 Claims, 4 Drawing Sheets

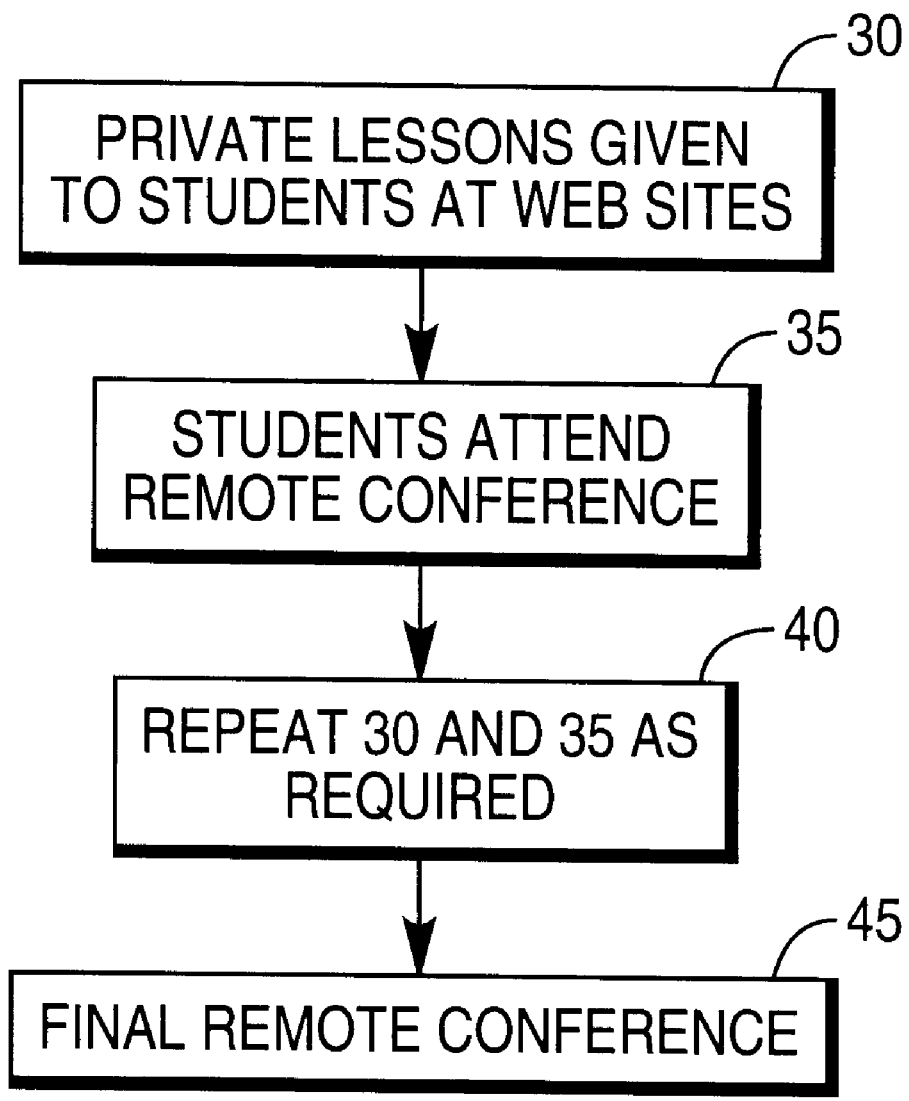

WEB-BASED EDUCATION

The present invention concerns an educational approach wherein a web based, role focused framework provides a graphical user interface from which blended (web-based, other computer based (CDROM), webroom and classroom) learning activities are deployed and tracked to regionally based audiences. The framework is arranged into five basic modules: industry, solution, processes, skill and tools. Private lessons are first given to students through web sites (modules of the framework). Then the students attend a class, but through a web conference, without actually attending a class room. In the webroom, a facilitator explains and elaborates the principles set forth in the private lessons and also provides guided practice of the application of the skill/concept on-line. In some cases the private lesson and webroom provide the prework necessary to an actual live simulation session held in a traditional classroom setting. This approach shortens the amount of face to face time required to master a skill, process or concept.

BACKGROUND OF THE INVENTION

Computer-based education is widespread. However, it appears that some types of education still require the presence of a human instructor. Consequently, the invention presents an approach wherein both the benefits of computerized education are exploited, and the benefits of a human instructor are largely retained. The invention has particular applicability to (1) education wherein students learn to fulfill a role, or a particular type of behavior, and (2) education which imparts knowledge of a technique, as opposed to knowledge of facts and theories. The web framework arranges material into five major modules from which these lessons are delivered: industry, solution, skills, processes and tools

OBJECTS OF THE INVENTION

An object of the invention is to provide an improved and more effective (from both a cost and performance basis) blended (computer based and live facilitated) educational system.

A further object of the invention is to provide an educational system wherein both private lessons and group lessons are held using the Internet, and individuals' progress through this system are tracked and monitored on-line.

SUMMARY OF THE INVENTION

In one form of the invention, students take private lessons from web sites. After completion of one, or more, private lessons, the students collectively attend a class, but the class is held using remote conferencing, such as web conferencing. The students are not present in the same class room, but are situated at geographically different locations, even in different countries. In the class, a facilitator elaborates on the subject matter presented in the private lessons.

BRIEF DESCRIPTION OF THE DRAWINGS

FIG. 5 is a flow chart illustrating processes undertaken by one form of the invention.

DETAILED DESCRIPTION OF THE INVENTION

Figure 1:
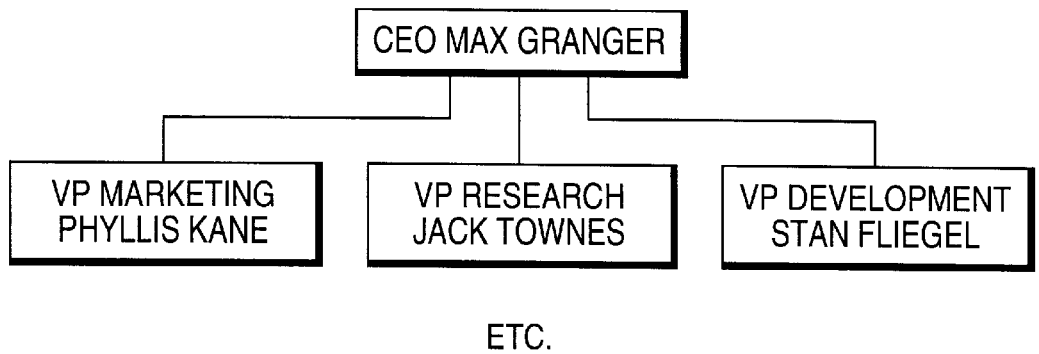
FIG. 1 illustrates a simple organization chart.

This discussion will explain a generalized, simplified form of the invention, and then a more detailed example.

Simplified Example

A simple example of one form of the invention will be given. The invention first explains a general principle, or theory, to students. The explanation is given in private lessons, delivered through a web framework. Multiple students, at different locations, may independently log in to the web site, to take the lessons.

The subject matter of the lessons is not restricted to any particular field. For example, in physics, the general principle may be an explanation of Newton's Equation F=ma, wherein F represents force, m represents mass, and a represents acceleration.

As another example, in mathematics, the general principle may be the chain rule: $d(f(g)(x))=d(f)/d(x)$.

As a third example, in marketing, the general principle may be a set of rules on questions to ask a potential client, in order to learn the client's problems.

After the lesson, the web site may give an examination to the students, and record the results.

After the lesson and possible examination, a group conference, or class, is held, wherein the students meet with a facilitator. The group conference is preferably a remote conference, wherein most, or all, parties are situated at different locations, and communicate using both a voice and a data lines for the computer webroom connection.

The invention may require that students attain a specific score on the examination, in order to be admitted to the conference.

In the conference, the facilitator illustrates specific examples of the general principle explained by the web site. For example, the moderator may provide numerical examples showing how a force F of 10 Newtons causes an object of 1 kilogram mass to accelerate at 10 meters per second per second. The facilitator may pose problems to the students, to increase the students' familiarity with the principle, as by asking what size force F is required to accelerate a 10 kilogram mass to a velocity of 100 feet per second within 5 seconds.

As another example, in the case of the mathematics chain rule, the facilitator may illustrate problems to which the rule is applicable.

In the marketing example, the facilitator may give specific examples of questions to ask the client, and specific questions to avoid asking.

Therefore, one form of the invention breaks up the educational process into (1) components which students can handle on their own, independently, and (2) components in which students are directly coached or tutored, in the conference. Component (1) is delivered to the students in private lessons, through the medium of a web site on a network, such as the Internet. Component (2) is delivered through a remote conference, such as a web conference.

The web conference may utilize the Internet to carry its data. It may use high-speed telephone lines, or a combination of the two.

More Complex Example

Another form of the invention is directed primarily toward training of sales representatives. The training is divided into two parts. One part, handled by web sites, delivers explanations of a theory, or general principles, in private lessons. The other part, handled in a web conference, involves a moderator who delivers detailed explanations and examples of applications of the general principles. The facilitator is an experienced sales professional, who fully understands the general principles discussed.

This discussion will give a detailed explanation of one type of marketing system in which the invention can be used to provide training. It is understood, however, that other systems exist, and the invention is applicable to them as well.

The system in question is known by several names, and exists in various modifications. However, several important features of the system are the following. One, it is best applied to sales of high-valued items, services, and systems. "High valued" is a loose term, but an item having a value which exceeds the buyer's yearly income is certainly a high-valued item, in the present context.

A second feature is that multiple parties will probably be involved in the purchasing decision.

A third, and perhaps the most significant, feature is that a primary goal is to impart an understanding to the prospective buyer of the value of the purchase to him/her. That is, a major goal is to cause the prospective buyer to actually realize, or internalize, the value of the purchase, and to express that realization. This goal should be contrasted with another approach, namely, one in which the representative explains the valuable features of the purchase, while the buyer listens. This other approach lacks the internalization, which is considered a deficiency.

Overview

One approach to achieving the last feature using the invention will now be explained. In overview, the approach involves several steps. A first step is to attain an understanding of the buyer's condition, or status. The succeeding steps will be here explained collectively, and then identified individually.

The knowledge of the status provides a background which the marketing representative uses to pose questions to the buyer, in an attempt to identify problems which the representative's product, or solution, can solve.

In posing the questions, the representative takes a specific strategy. The representative attempts to identify unrecognized, or unexpressed, needs of the buyer, and then attempts to persuade the buyer to recognize those needs. After the recognition, the representative takes a sequence of inquiry which induces the buyer to examine the ramifications of the needs, or the ramifications of not resolving them, particularly in terms of cost.

When the buyer sees the ramifications, and their costs, the buyer is prompted to express that understanding verbally. At that time, a presentation of the representative's solution, or product, is seen as most opportune.

Therefore, a primary goal is to persuade the buyer to understand him- or herself the benefits of the representative's solution, and to express that understanding. This goal is opposed to another approach wherein the representative merely lists the benefits of the solution, and expects that activity to impart an understanding to the buyer.

The Steps

The individual steps of the strategy outlined above can be broken into six primary phases, or steps: (1) understanding the buyer's status, or condition, (2) identifying problems in that condition, (3) identifying ramifications of the problems, (4) developing a line of discussion which leads the buyer to uncover the ramifications (as opposed to setting forth the ramifications to the buyer directly), (5) attaching a value to the ramifications, and (6) presenting the representative's solution as the logical step to remove the problems and their ramifications.

These phases are imparted to the students in the following manner. Each phase is divided into a two parts, such as theory and practice. The theory of each is explained to the students through private lessons given at web sites. Each student may be required to take an examination which proves satisfactory mastery of the theory. Then, for the second part, a facilitator illustrates application of the theory to the students, in a remote conference. In the remote conference, the facilitator may assume the role as the buyer, and ask selected students to interact with the facilitator, according to the principles of the theory.

This process is repeated for each phase. Finally, all six phases are collectively applied, in a mock sales interaction, in the remote conference. This approach will be explained in greater detail.

Phase 1: Understanding Buyer's Condition

A prime factor in the theory of this phase is to instruct the students not to ask too many background questions, because such questions can bore and irritate the buyer.

Figure 2:
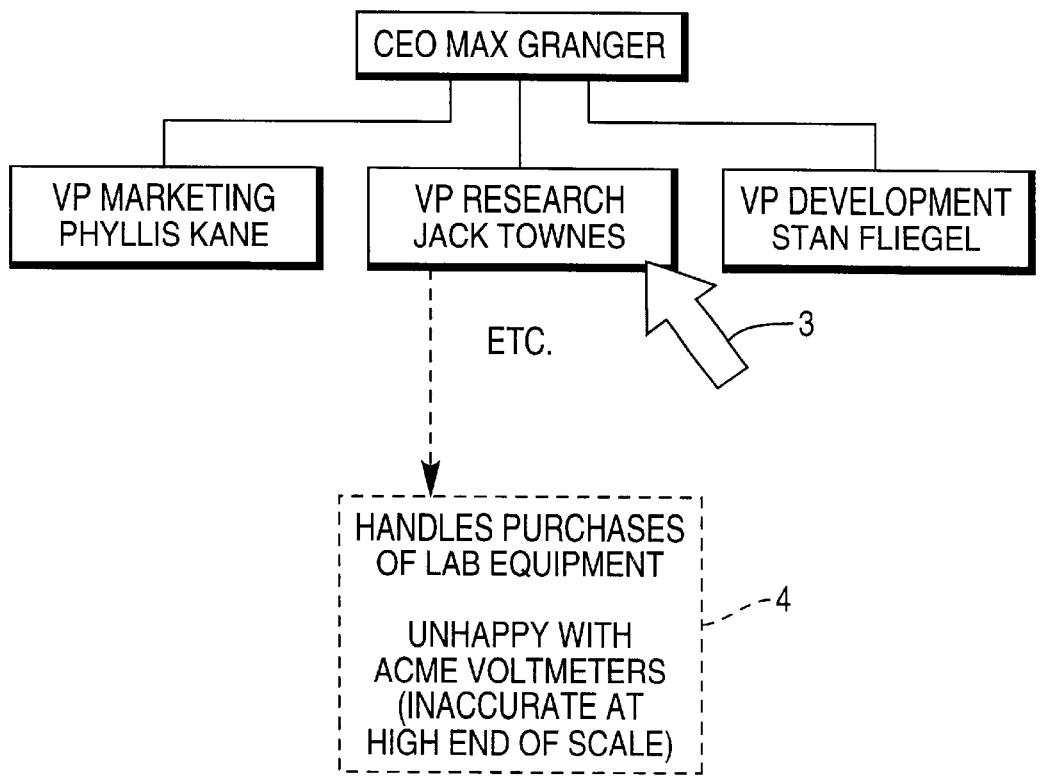
FIG. 2 illustrates how the invention provides background information on a person in the organizational chart of FIG. 1.

In one embodiment, the buyer is presumed to belong to an organization, such as a corporation, and preliminary background data is prepared for the students. FIG. 1 illustrates an organization chart 2 which is presented at the web sites to the students. Each student selects any of the persons in the organization chart, as by using a pointing device, indicated by arrow 3 in FIG. 2. The selected person becomes the student's potential buyer. In response to the selection, the invention presents preliminary background data 4 on the selected person, as indicated in FIG. 2.

After the web-site interaction, and possibly passing a qualifying examination indicating mastery of the subject matter, the students attend the remote conference. An instructor, or facilitator, presents additional information, and undertakes role-based modeling, wherein he/she interacts with another party, or the students, and illustrates the questioning considered appropriate for this phase.

Phase 2: Identifying Problems

In the web-site interaction, or private lessons, the students are instructed that they are to ask questions which uncover the buyer's difficulties and problems. The students are to develop inferences as to the types of problems, based on Phase 1.

The web-site interactions will suggest types of questions to ask, such as:

BUYER: Does the age of your present equipment cause reliability problems?

BUYER: In the peak sales season, do overloads block your throughput?

In the remote conference, the moderator may elaborate on these questions, and techniques of posing them.

Phase 3: Identifying Ramifications

In the web-site interaction, the students are instructed in the concept that the buyer must be brought to a realization of the true cost of the problems. Thus, the ramifications of the problems should be identified.

In the web site interaction, the students are instructed in general theory. For example, research has found that certain tactics, such as presentation of features of the item to be sold, have a tendency to invite the buyer to ask whether that feature is worth the cost of the item. Many times, the buyers will answer in the negative. Thus, the theory suggests that, rather than present features, the students should first identify ramifications, and then the costs associated with the ramifications, so that the value of the purchase can be measured by the value of eliminating those costs.

In the remote conference, the facilitator will explain these theoretical points in greater detail. He/she will present suggested strategies for posing questions, and contrast a favored strategy with a non-favored type. For example, the facilitator may give this example of a non-favored line of inquiry, using role-playing with another party:

SELLER: Does your organization use the Oxymoron paper shredder?
BUYER: Yes, but it breaks down frequently, and new personnel take a long time to learn to use it.
SELLER: Can I demonstrate our Shred-O-Matic? It is guaranteed reliable for one year, and only costs $35,000.

The moderator will then explain why this line of inquiry is unsatisfactory: the buyer will probably reason that attainment of reliability is not worth $35,000. The moderator will then present a more favored line of questioning:

SELLER: Does your organization use the Oxymoron paper shredder?
BUYER: Yes, but it breaks down frequently, and new personnel take a long time to learn to use it.

The moderator will then explain that the representative should coach the buyer through an analysis of the true costs of the breakdowns, and the personnel's learning curve in learning the shredder. For example, the representative should point to (1) the time of personnel consumed in repairing the breakdowns, (2) the fact that overhead of the company is still incurred while the shredder is non-operational, (3) the fact that the learning curve of new personnel is an expense, as is the time of other personnel involved in training them, and so on.

Phases 4 and 5: Leading the Buyer to Attain Realization of the Costs of the Ramifications The private lessons in the web-site interaction set forth the principle that, ideally, the buyer is to come to an understanding of the ramifications of the problems. Also, the buyer is to come to an understanding of the true costs of the ramifications. Research has found that such an understanding can have a greater persuasive impact on the buyer than an explanation of the ramifications, and costs, given by the representative.

In the remote conference, the moderator will present examples of leading the buyer to this realization, and especially of leading the buyer to verbally express the realization.

Phase 6: Presentation

The web-site interaction may be eliminated at this stage, and the representative may proceed with presentation of the solution to the customer. After these phases, the students may undertake role-playing in the remote conference, wherein they practice the techniques discussed in the previous lessons and conferences.

Flow Chart

Figure 3:
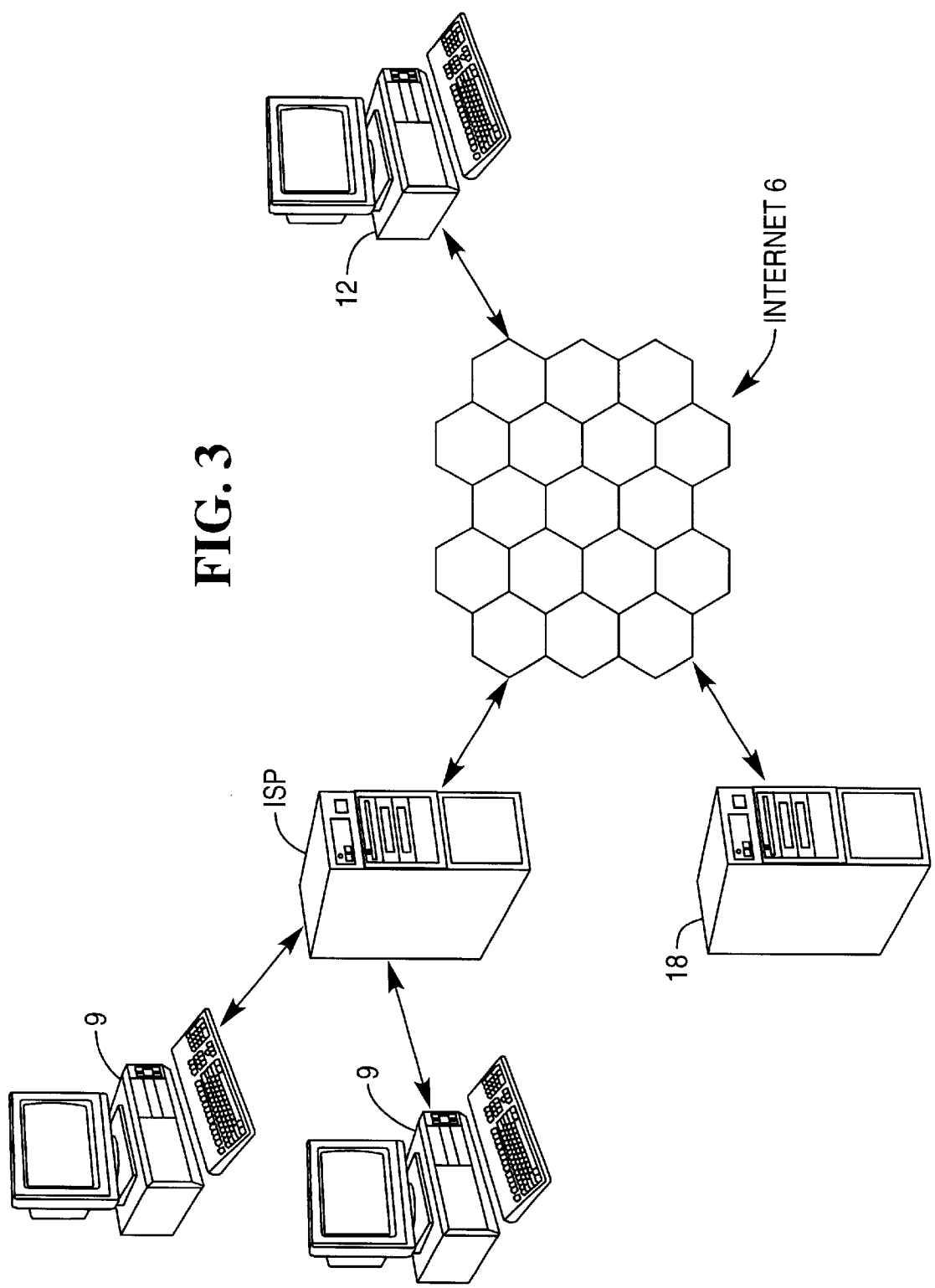
FIG. 3 illustrates in schematic form one view of the Internet, wherein students visit web sites.
Figure 4:
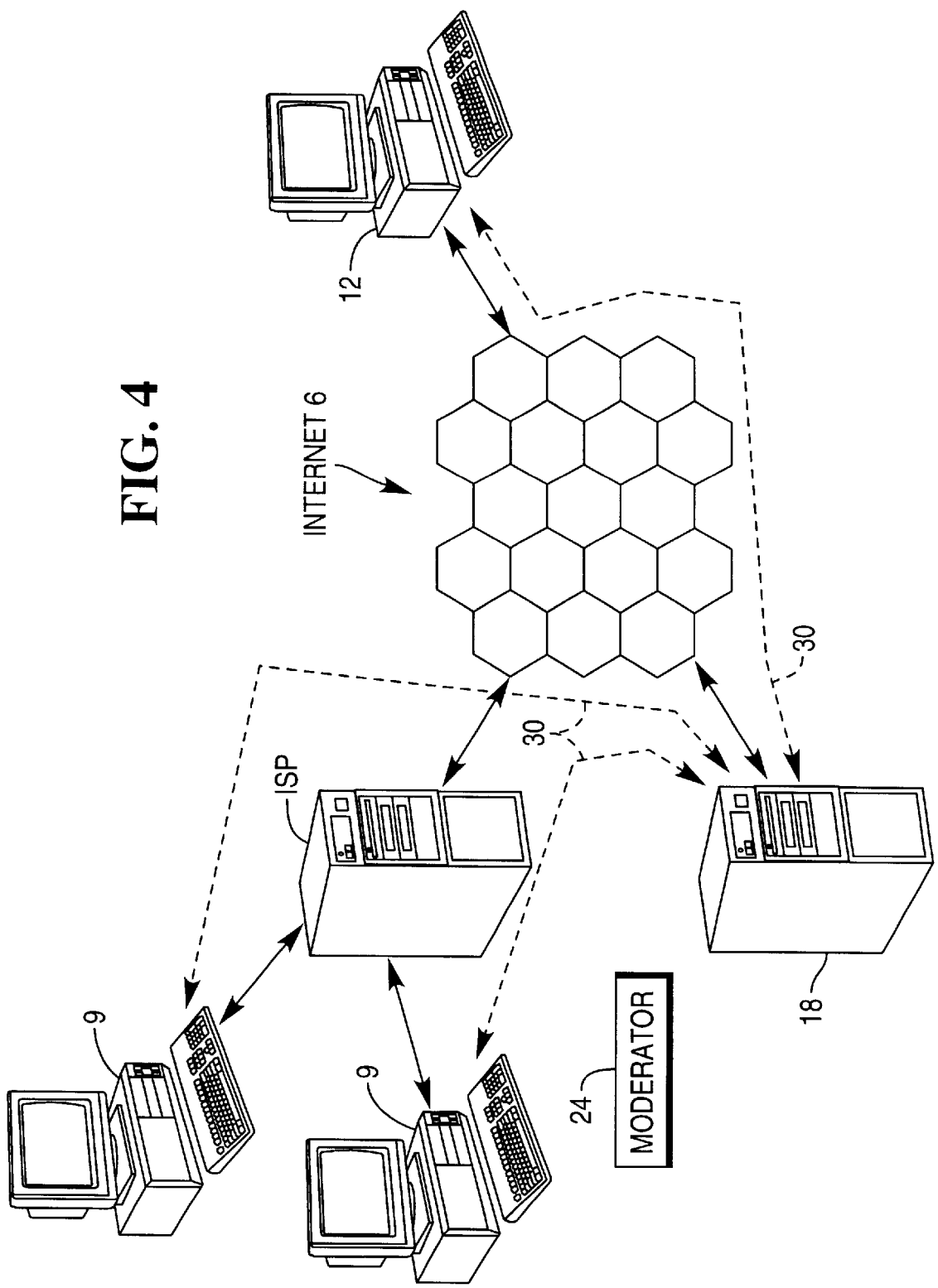
FIG. 4 illustrates a remote conference held among the parties of FIG. 3. While FIG. 4 indicates that the Internet is used in supporting the remote conference, other systems can be used, including the public-access telephone network, satellite links, and cable television links.

FIG. 3 illustrates a network 6 such as the Internet. Students (not shown) use computers 9 to connect to the Internet 6, perhaps through Internet Service Providers, ISPs, as indicated. However, some students, such as that using computer 12, may have access to a node on the Internet, and will not need an ISP. This can occur for students who are affiliated with a university, or a company which maintains a node, for example.

The students visit one or more web sites, which perform the functions described above. The web sites are maintained by servers such as server 18. Then, after the students complete their private lessons, a remote conference is held among the students and the facilitator 24, as described above. Dashed lines 30 indicate the conference.

FIG. 5 is a flow chart illustrating one sequence of operations. In block 30, students visit the web sites, for individual instruction. In block 35, the students participate in a remote conference. Block 40 indicates that blocks 30 and 35 are repeated as many times as necessary. Block 45 indicates the final role-assumption, wherein selected students assume the role of the sales representative in a remote conference, and interact with a mock buyer.

Additional Considerations

1. The remote conference can be held by way of a web site, which may, or may not, be the same site which the students visited in their individual instructions. For example, in its simplest characterization, the remote conference is nothing more than a transfer of data. If it takes the form of a conference, then each participant transfers slide images to the conference, and also an audio track, if the participant is speaking at that time. The transfers may be to a central location, which then distributes the data to the remote participants, and the facilitator.

Clearly, these transfers can be funneled through a web site. That is, the server, or servers, which support the web site also handle the web audio conferencing.

This approach simplifies logistics for the students, particularly because interaction with web sites is becoming very widespread. Students who are already familiar with web sites need learn nothing new, in order to log into the remote conference.

2. In one form of the invention, the students are taught to classify the buyer's statements into categories, and then present a response suitable for each category. More specifically, in the web-site interaction phase, the categories are explained to the students. For example, a given response by the buyer may be classified as an objection, wherein the buyer identifies a problem with the solution to be presented by the representative. As two more examples, the buyer may express an implicit need, or explicit need. Such needs are well known in the art of marketing.

Then, in the remote conference, the facilitator provides examples of the categories. For example, an example of an objection would be this: "The oxymoron paper shredder will not shred onion skin paper. We use a lot of that type of paper."

An example of an implicit need may be this: "Our present paper shredder sometimes skips pages, and does not shred them properly." An example of an explicit need may be this: "We need a paper shredder which does not skip pages, and shreds every one."

3. It is not required that the students visit the same web site for all private lessons. Different web sites can be used, linked to the common framework web site.

4. The private lessons, given on web sites, may include the option of allowing the student to request a personal conference, wherein the student asks questions of a human tutor. Systems in which a web site allows a visitor to undertake a personal conference are known in the art.

Numerous substitutions and modifications can be undertaken without departing from the true spirit and scope of the invention. What is desired to be secured by Letters Patent is the invention as defined in the following claims.

What is claimed is:

1. A method, comprising:
   a) explaining subject matter in a private lesson delivered to a student through a web site;
   b) after the private lesson, holding a video conference with the student, wherein a moderator further explains the subject matter.

2. A method, comprising:
   a) maintaining one or more web sites which present a sequence of lessons to students, each lesson explaining a general principle of a respective technique; and
   b) after each lesson, holding a conference wherein students at remote locations observe demonstrations of the general principle of the lesson being applied to specific situations.

3. Method according to claim 2, wherein the conference receives matter comprising data, speech, or both from a participant, and distributes the matter to all other participants.

4. A method, comprising:
   a) maintaining a web site which presents a sequence of lessons to students, such that
      i) a lesson A describes a type of response A to a statement of type A;
      ii) a lesson B describes a type of response B to a statement of type B; and
   b) after each lesson, using remote conferencing equipment to hold a conference wherein remotely situated students observe a facilitator who provides
      i) specific examples of the type of response described in the preceding lesson.

5. Method according to claim 4, wherein the facilitator
   c) provides a specific example of a statement, and
   d) requests a student to provide a specific response, according the preceding lesson.

6. A method of inviting participants to a remote conference, comprising:
   a) using a web site to present background materials to visitors;
   b) using a web site to test visitors on their mastery of the background materials; and
   c) admitting to the remote conference visitors whose test results meet predetermined criteria, and declining admission to others.

7. Method according to claim 6, wherein the remote conference receives matter comprising data, speech, or both from a participant, and distributes the matter to all other participants.

8. Method according to claim 6, wherein the remote conference comprises audio and visual communications among participants situated at different locations.

9. Method according to claim 8, wherein the remote conference is held using packet transfer over the Internet.

10. A method, comprising:
    a) maintaining a web site which explains an approach to classifying statements received from a party;
    b) holding a remote conference, in which previous visitors to the web site are participants, which presents specific examples of statements, and their classifications.

11. Method according to claim 10, and further comprising:
    c) using the web site to explain to visitors a goal to seek for each statement of a different class; and
    d) using the remote conference to set forth examples of responses to the statements, which further the goal.

12. Method according to claim 10, wherein the remote conference receives matter comprising data, speech, or both from a participant, and distributes the matter to all other participants.

13. A method, comprising:
    a) maintaining a web site which provides evidence to visitors which explains value of a particular technique of interviewing subjects; and
    b) holding a remote conference wherein groups of the visitors, at different locations, observe a facilitator giving examples of the technique.

14. Method according to claim 13, wherein the remote conference receives matter comprising data, speech, or both from a participant, and distributes the matter to all other participants.

15. Method according to claim 13, and further comprising:
    c) conveying a request by the facilitator to visitors that the visitors give examples of the technique.

16. Method according to claim 15, and further comprising:
    d) conveying an example provided by one visitor to the conference participants.

17. Method according to claim 16, and further comprising:
    e) requesting evaluations of the example from the participants.

18. A method, comprising:
    a) maintaining a web site which explains a goal to seek, when a specific type of statement is received from a party; and then
    b) using remote conferencing equipment to hold a conference in which a facilitator provides
       i) specific examples of the type of statement, and
       ii) specific examples of responses to the statement which further the goal.

19. Method according to claim 18, wherein
    c) one or more conference participants provide specific examples of the responses to the statement.

20. Method according to claim 18, wherein the conference receives matter comprising data, speech, or both from a participant, and distributes the matter to all other participants.

* * * * *